350-376 SR
XR 3,541,577
SEARCH ROOM

Nov. 17, 1970 J. U. LEMKE 3,541,577

METHOD OF CURIE POINT RECORDING

Filed June 28, 1967 3 Sheets-Sheet 1

JAMES U. LEMKE
INVENTOR.

BY Raymond A. ...

ATTORNEY.

3541577
OR IN 360/16

JAMES U. LEMKE
INVENTOR.

BY Raymond A. Anderson
ATTORNEY.

Nov. 17, 1970 J. U. LEMKE 3,541,577

METHOD OF CURIE POINT RECORDING

Filed June 28, 1967 3 Sheets-Sheet 3

JAMES U. LEMKE
INVENTOR.

BY. Raymond A. Andrews

ATTORNEY.

United States Patent Office 3,541,577

Patented Nov. 17, 1970

3,541,577

METHOD OF CURIE POINT RECORDING

James U. Lemke, Sierre Madre, Calif., assignor to Bell & Howell Company, Chicago, Ill., a corporation of Illinois Filed June 28, 1967, Ser. No. 649,540
Int. Cl. G01d *15/12*; G11b *5/62, 5/86*
U.S. Cl. 346—74 13 Claims

ABSTRACT OF THE DISCLOSURE

Information is magnetically recorded by preparing a magnetizable medium characterized by magnetic particles having a shape anisotropy which imparts upon the particles a substantially stable remanence up to a predetermined temperature in the vicinity of the Curie point of said particles, and which dominates other qualities of said particles which tend to cause remanence diminutions in derogation of said substantially stable remanence, and by subjecting the medium to information-controlled thermal remanent magnetization which includes the steps of heating at least selected ones of said particles to an elevated temperature being at least as high as substantially said Curie point, cooling said selected particles to below said predetermined temperature, and magnetizing said selected particles during said cooling step.

BACKGROUND OF THE INVENTION

Field of the invention

The subject invention relates to the art of information recording and, more particularly, to the magnetic recording of information, the copying of magnetically recorded information, and to the printing of magnetically recorded information.

Description of the prior art

In recent years the art of magnetic tape recording by means of magnetic recording heads has been developed and refined to the point where near perfection has been achieved for many purposes. This stands in sharp contrast to the deficiencies which still exist in related areas, such as those concerned with the magnetic recording of information with the aid of heat or with the copying of magnetically recorded information from one medium to another.

Particularly the latter area is of increasing importance as more and more information, such as data, literature, music and television programs, is recorded on magnetic tape and is required to be efficiently duplicated on further magnetic tapes.

The art of duplicating magnetic records, such as information-magnetized recording tapes, is at present dominated by several distinctive methods. The oldest one of these simply employs a playback head for deriving the information from the master tape, electronic equipment for suitably processing the information so derived, and a magnetic recording head connected to this equipment for recording the information on the copy tape. While this type of method permits the production of several copies at the same time, it has the disadvantage that it requires the provision of a number of recording machines and that the quality of the copy is degraded by both the flutter or other imperfections of the master playback process and the flutter or other imperfections of the copy recording procedure.

Its main drawbacks become, however, apparent if the recorded information has broad frequency spectra, such as found in video or instrumentation applications. In that case, a severe synchronization problem is added, particularly if the information, out of necessity, was recorded on the master tape in one of the familiar slant-track or transverse scan patterns. In the same vein, if the recorded frequency spectrum approaches the recordable bandwidth of the duplicator, it is no longer possible to run the copying procedure faster than the original recording process, so that extensive periods of time are consumed for duplication purposes.

More advanced tape copy methods employ magnetic transfer fiield techniques borrowed from the art of anhysteretic recording. These methods are limited in scope and utility by the fact that special measures are required to curtail the impairment of the master record by the transfer fields. In most instances, these measures concern the manufacture of the master tape, such as the provision of a master tape recording medium of high coercivity, so that many existing records made without transfer field duplication in mind cannot be copied in this manner, or so that recording is impaired by the high coercivity of the master tape.

Another type of transfer method relies on magnetostrictive properties of certain recording materials and is thus limited in scope and applicability already by this fact alone. Further proposals are directed to improving the magnetization curve of the copy tape by agitation of its magnetic particles through the influence of magnetic, mechanical, radioactive or thermal strains. While these proposals move in a promising direction, they generally require a master tape having a considerable coercivity and a copy tape saturating at relatively low fields.

In the art of magnetic recording of information with the aid of heat, most propsals are characterized by a method which resides in a selective demagnetization of magnetic recording media. This is generally accomplished by raising the temperature of selected regions of the recording medium, which regions correspond to the information to be recorded or to blank spaces in the information pattern, to a temperature which is above the Curie point of the recording medium.

These proposals have the disadvantage of producing records which are relatively weak, since it is virtually impossible under practical working conditions to demagnetize the selected regions without also reducing the magnetization of adjacent areas of the recording medium. Some more advanced proposals attempt to counter this drawback by supplementing the applied heat energy with other forms of energy, such as that provided by alternating magnetic fields. However, even the latter expedient cannot prevent a partical demagnetization of those areas of the recording medium that are to remain magnetized.

In an effort to counter the latter drawback, more recently proposed methods in the subject area operate within temperature ranges that are below the Curie point of the particular recording medium. One of these methods employs hard magnetic recording media which have Curie points substantially above room temperature, and takes advantage of the fact that the coercivity, saturation and remanent magnetization of such media decreases gradually as a function of the applied temperature. According to that method, an alternating-current erasing field is applied to the medium at an amplitude insufficient to cause a loss of the magnetic signal at room temperature or at an elevated temperature which brings about a thermic effect. The information-controlled heat energy is then employed to raise the temperature of selected regions of the recording medium to a point where the coercivity of the magnetic particles in those regions has decreased so that it is surpassed by the erasing field, which then effects a selective demagnetization.

As an extension of this method, it has also been proposed to produce a negative record of an information pattern by raising the temperature of selected regions of an unmagnetized recording medium to a point where the coercivity of the magnetic particles in those regions is overcome by an external magnetic field which is of a strength that is insufficient to overcome the particle's processed coercivity at lower temperatures.

While methods of this kind overcome certain drawbacks of the earlier described above-Curie-point procedures, they largely retain those disadvantages which are predicated on the relatively large temperature range in which the mentioned coercivity decrease takes place and on the resulting relatively flat slope of the coercivity diminution in that range. These disadvantages manifest themselves primarily in high energy requirements as to the information-modulated applied heat and in the difficulty of effectively controlling the desired information-responsive magnetization differentials.

To date there have been suggestions to increase the coercivity of magnetic particles by exploiting anisotropies thereof. In particular it has been pointed out that if the anisotropy is caused by shape, a less rapid change of the coercive force with temperature is to be expected. However, there still exists a need for a general approach which will result in a solution of the problems pointed out above. For instance, even with the last-mentioned advanced method it is necessary to provide the external magnetic field at a threshold value sufficient to overcome the mentioned coercivity. This, together with the coercivity characteristics of the medium in the temperature range in which that method operates, leads to a non-linear recording of the applied information.

SUMMARY OF THE INVENTION

The present invention provides a method of magnetically recording information which produces superior information records or copies.

The inventive method can be described as being basically comprised of two steps. One of these is the step of preparing a magnetizable medium characterized by magnetic particles having a shape anisotrophy which imparts upon these particles a substantially stable remanence up to a predetermined temperature in the vicinity of the Curie point of said particles, and which dominates other qualities of the magnetic particles which tend to cause remanence diminutions in derogation of the named substantially stable remanence. The experssion "characterized" in the preceding sentence is means to indicate the essential feature of the magnetizable medium as far as the described one step according to the subject invention is concerned.

The other step of the basic inventive method resides in subjecting the medium just defined to information-controlled thermal remanent magnetization which includes the steps of heating at least selected ones of the particles to an elevated temperature being at least as high as substantially their Curie point, cooling these particles to below the named predetermined temperature, and magnetizing these selected particles during this cooling step.

As this description proceeds, it will be recognized that the nature of each of these steps, as well as the combination thereof, leads to superior results to be more fully described below and including the highly efficient production of sharp and strong information records and copies of information records, such as those present on magnetic recording tape.

From another aspect thereof, the subject invention also provides magnetic tape recording apparatus adapted to tape-to-tape information copying methods.

BRIEF DESCRIPTION OF THE DRAWINGS

The subject invention and its various aspects will be more readily apparent from the following detailed description of preferred embodiments thereof, illustrated by way of example in the accompanying drawings in which.

DESCRIPTION OF THE PREFFERED EMBODIMENTS

Figure 1:
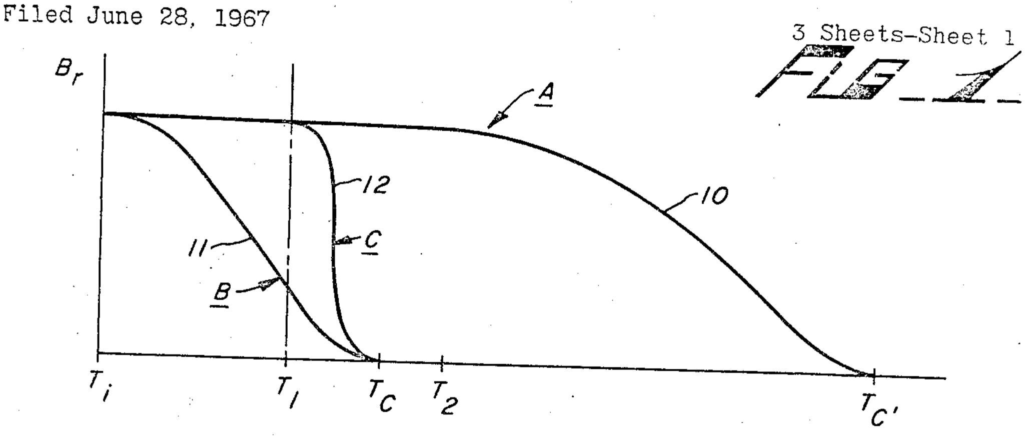
FIG. 1 is a qualitative graph of remanent magnetization characteristics as a function of temperature.

The qualitative graph of FIG. 1 illustrates by means of curves 10, 11 and 12 the remanence of three magnetic recording media A, B and C as a function of temperature T. For explanatory purposes the media A, B and C are represented as being heated from an initial temperature $T_i$.

The medium A is representative of magnetic recording materials, such as gamma ferric oxide, which display a gradually sloping remanence characteristic that occupies a large temperature range below the Curie point $T_C'$. It is easy to see from the curve 10 that it is practically impossible to heat selected portions of the medium A above the Curie point $T_C'$ without increasing at the same time the temperature of adjacent regions of the medium to values which entail a reduction in the remanence of those regions. For instance, heat will flow from the selected portions to adjacent regions or, if this is to be avoided by a very brief application of the information-modulated heat energy, it will be necessary to preheat the medium to a temperature in the vicinity of the Curie point $T_C'$.

The medium B is representative of materials, such as chrominum dioxide, which have a comparatively low Curie point TC as is well known in the art. A low Curie point is favorable in many applications in which factors such as the constitution of the medium prohibits the use of high temperatures or in which the feasible temperature of the available heat energy is itself limited. However, the problems just outlined with respect to the medium A are not avoided by the use of the medium B if that medium has a relatively gradually sloping remanence characteristic as shown by the curve 11.

The remanence curve 12 of the medium C illustrates the result of a systematic approach to these problems. In accordance with one of the above mentioned basic steps of the subject invention, the magnetizable medium C is characterized by magnetic particles which have a predetermined quality of anisotropy that satisfies several conditions. First, the predetermined quality of anisotropy imparts upon the particles a substantially stable remanence within a first temperature range, which is illustrated in FIG. 1 by the range extending from $T_i$ to $T_1$. Secondly, this predetermined quality of anisotropy imparts upon the particles a rapidly declining remanence within a second temperature range, which is illustrated in FIG. 1 by the range extending from $T_1$ to $T_C$.

The two conditions just mentioned are apparent in FIG. 1 from the stable portion of the curve 12 between $T_1$ and $T_1$ and the acutely sloping portion of the curve 12 between $T_1$ and $T_C$.

Thirdly, the predetermined quality of anisotropy of the magnetic particles is made to dominate other qualities of these particles which tend to cause remanence diminutions within the mentioned first temperature range in derogation of the recited stable remanence.

Pursuant to a preferred method according to the invention, the geometric aspect ratio of the particles or of at least the dominant portion of the particles of the medium C is dimensioned so that the particles' shape anisotropy dominates their crystal anisotropy. In this manner, a remanence characteristic of the type illustrated by curve 12 in FIG. 1 is realized, since crystal anisotropy promotes temperature-dependent coercivity losses well below the particles' Curie point, while shape anisotropy sustains a substantially stable coercivity or remanence into the vicinity of the particular Curie point. As a further feature, this leads to a relatively acute decline of the remanence curve within a comparatively narrow temperature range close to the Curie point.

These features produce results that are highly significant in the area under consideration. For instance, it is easily seen from the curve 12 of FIG. 1 that the application of information-controlled heat differentials to media of the type C is conveniently and efficiently and efficiently affected within a relatively narrow temperature range. At the same time, regions of the medium can be heated up to the neighborhood of the critical temperature $T_1$ without being subjected to the ferromagnetic phenomena that take effect within the temperature range $T_1$ to $T_C$, or $T_1$ to $T_2$, whereby $T_2$ is a temperature beyond the Curie point $T_C$.

The combination of these features leads to high-quality magnetic information records, since very pronounced ferromagnetic effects can be accomplished with limited amounts of heat energy within a narrow temperature range, and since the magnetic state of regions which are not to be subjected to these effects is not materially adversely affected by the heating of selected areas above the temperature $T_1$. The latter advantage is due to two reasons. First, the remanence curve is substantially stable up to $T_1$, despite of the sharp decline beyond that temperature. Secondly, if relatively small energies are sufficient to accomplish the desired ferromagnetic effects beyond $T_1$, the danger that heat energy may flow to the regions of the medium that are not to be heated beyond $T_1$ is correspondingly lessened until it becomes practically insignificant.

In accordance with the above mentioned second basic step of the subject invention, information-controlled thermal remanent magnetization is employed in order to record information on the magnetic medium. The significance of this step is illustrated in FIG. 2 which plots remanent magnetization $B_r$ against applied magnetic field strength H.

Figure 2:
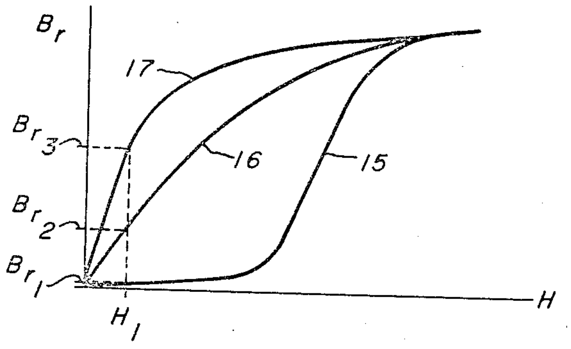
FIG. 2 is a qualitative graph illustrating remanent magnetization characteristics under different magnetization conditions.

In FIG. 2, the curve 15 illustrates the well-known direct-current remanent magnetization, while the curve 16 relates to anhysteretic remanent magnetization, which is equally well known from its beneficial effect in magnetic tape recording. The curve 17 on the other hand is obtained by thermal remanent magnetization which is characterized by a heating of the magnetic recording medium, here medium C, FIG. 1, beyond the temperature $T_1$ and by the application of a magnetic field or fields while the recording medium is cooled or is permitted to cool down from an elevated temperature above $T_1$. The presence of the magnetizing field or fields cooling is an essential feature of the presently discussed method step according to the invention.

In principle, thermal remanence magnetization effects occur even if the temperature of the medium C is driven to a point which, while being located above $T_1$, is situated below the Curie point $T_C$. However, the strongest thermal remanent magnetization effect is obtained if the temperature of the particles to be subjected thereto is driven to the Curie point $T_C$, or even somewhat beyond $T_C$. This is very important as far as factors such as high signal-to-noise ratio or qualitative and quantitative acuity of the recording are concerned. A strong remanent magnetization effect not only imparts intensity to the recorded signal, but permits the use of magnetic fields which are too weak to magnetize to an objectionable degree portions of the medium located beside the signal recordings, and which are generally much weaker than corresponding magnetizing fields applied by the prior art.

This is seen from FIG. 2, where a field strength $H_1$ applied for thermal remanent magnetization has been qualitatively indicated. This field strength leads only to a small remanent magnetization $B_{r1}$ as to portions of the medium which are not heated above $T_1$. On the other hand, a strong remanent magnetization $B_{r3}$ results as to those regions which are subjected to thermal remanent magnetization which includes a cooling of these regions from $T_C$ or above $T_C$ down to below $T_1$ while these regions are subjected to a magnetic field of the strength $H_1$. This remanent magnetization $B_{r3}$ is even stronger than the remanent magnetization $B_{r2}$ obtained by the mentioned anhysteretic method which is considered invaluable in the magnetic tape recording art.

As an added advantage, the linearity of the resulting recording is at a maximum when the thermal remanent magnetization step just described is employed, inasmuch as the remanent magnetization illustrated by the curve 17 has a long initial linear region.

In practice, closely similar effects may be produced even if the affected particles are not heated exactly to the Curie point $T_C$. However, in accordance with the teachings of this invention it is even in such cases necessary to heat the particles at least up to the temperature region where the curve 12 of FIG. 1 experiences its lowermost bend directly adjacent $T_C$. It is for present purposes considered that this narrow region is included in the general designation "Curie point."

Figure 3:
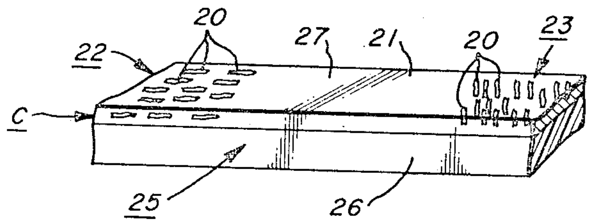
FIG. 3 is a perspective sectional view of a recording medium employed according to the subject invention.

As to physical organization, FIG. 3 shows that the magnetic particles 20 which characterize the recording medium C may, for example, be oriented in parallel to the recording surface 21 as shown at 22, or at right angles to that surface 21 as illustrated at 23. While a longitudinal orientation has been shown at 22, a transverse orientation may be employed instead. As is well known, a transverse orientation is preferable if information is recorded in slant or transverse tracks, as is generally done in modern video tape recorders.

In both cases, the particles 20, as to the dominant majority thereof, extend parallel to each other. The orientation 22 is generally preferred for information recording or copying processes in which the required heat energy is applied through the surface 21. The orientation 23, on the other hand, has significant advantages if the required heat energy is driven through the recording medium before being made to impinge on an information record that will establish the information-indicative heat gradients. In the latter case, the vertical orientation 23 increases the transparency of the medium to electromagnetic radiations, such as heat or light.

In FIG. 3, the medium C is shown as being implemented in a magnetic recording tape 25 which includes a carrier tape 26 that may be of a heat-stable material, such as Mylar, and a coating 27 in which the magnetic particles 20 are embedded. Suitable coating materials and processes for embedding the particles are already known, as are suitable magnetic materials for the particles 20. For present purposes, chromium dioxide particles are preferred for their relatively low Curie point and their susceptibility to being prepared in needle-shaped or acicular form.

In accordance with a further important feature of the subject invention, the desired thermal remanent magnetization may be effected by the use of an information-indicative magnetic field, as distinguished from information-indicative heat gradients. For example, the medium may be heated uniformly, while information-indicative magnetic field gradients are applied during the thermal remanent magnetization.

Figure 4:
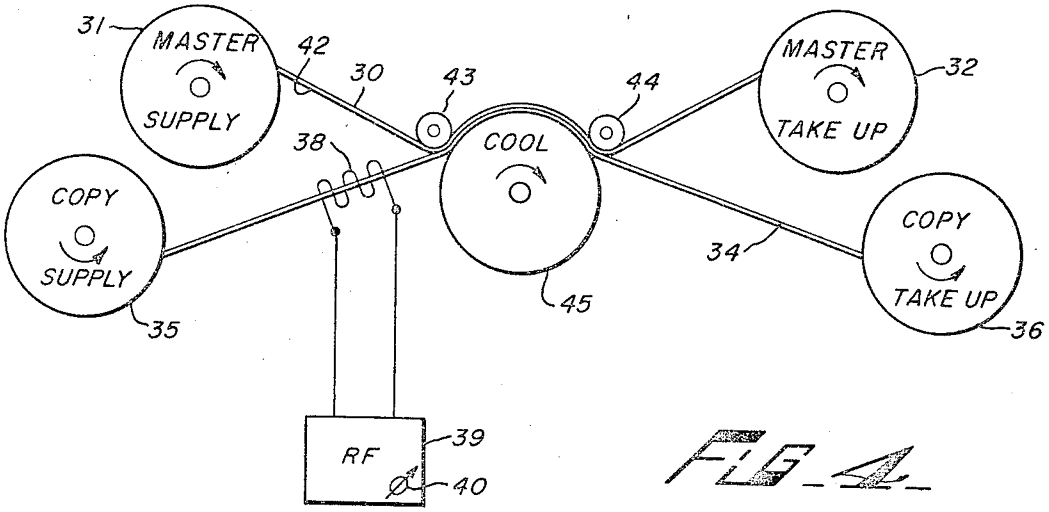
FIG. 4 is a schematic side view of a tape copying apparatus implementing a preferred embodiment of the subject invention.

An embodiment of this mode of magnetization is illustrated in FIG. 4. According to this figure, a first magnetic recording tape 30 is transported from a supply reel 31 to a take-up reel 32. Similarly, a magnetic recording tape 34 is transported from a supply reel 35 to a take-up reel 36. The tape 30 may be called "master tape" and has information magnetically recorded thereon. This may be done in a conventional manner, such as by means of a magnetic recording head in a magnetic tape recorder (not shown).

The master tape 30 may have a conventional recording medium, such as one comprised of gamma ferric oxide particles which, as shown in FIG. 1, have a Curie point $T_C'$ which is above the Curie point $T_C$.

The recording tape 34 may be called the "copy tape." The tape illustrated in FIG. 3 may be used for this purpose. It will be recalled that this type of recording medium has a lower Curie point $T_C$ than the more conventional magnetic recording media and is characterized by a substantially stable remanence to up $T_1$ and a subsequently sharply declining remanence between $T_1$ and $T_C$ (see curve 12, FIG. 1).

After leaving the supply reel 35, the copy tape 34 is drawn through an electromagnetic coil 38 which is energized by a source of radio-frequency energy 39 regulated at 40. While other sources of heat energy, such as infrared sources or heated roller may be employed, the subject invention prefers the use of radio-frequency heating, since experiments have confirmed that this evokes heat in the magnetic particles directly, as the tape itself and the binder in the coating are good dielectrics thus minimizing the required heat input and possible heat damages to the tape and coating.

Radio-frequency sources for heating purposes are well known as such.

After the copy tape 34 has been heated, it is brought into contact with the master tape 30. For best results as to signal intensity and signal-to-noise ratio, the master and copy tapes are arranged such that the recording surface 21 (see FIG. 3) of the copy tape 34 contacts the recording surface 42 of the master tape 30.

Cooperating rollers 43, 44 and 45 assure an intimate mutual contact of the tapes 30 and 34 and help to prevent mutual slippage between such tapes. The rollers 43 and 44 are idling rollers, while the roller 45 serves the purpose of cooling the particles 20 by drawing heat from the tape 34.

The applied radio-frequency energy is adjusted at 40 so that the magetizable particles of the copy tape 34 are heated to a temperature at least as high as their Curie point $T_C$. In practice, heat losses are taken into account by heating the particles to a temperature above $T_C$, such as the temperature $T_2$ indicated in FIG. 1. For example, the temperature interval between $T_C$ and $T_2$ may be correlated to the heat losses encountered between the heating step and the thermal remanent magnetization step presently to be described.

The cooling roller 45 draws sufficient heat from the tapes so that the particles 20 of the copy tape 34 are cooled to a temperature in the stable remanence range (see FIG. 1). For instance, these particles are cooled to a temperature below $T_1$ shown in FIG. 1 while the master and copy tapes are in mutual contact on the roller 45.

In this fashion, the cooling of the particles 20 of the copy tape 34, from $T_2$ down to below $T_1$ takes place while the copy tape is in contact with the master tape and is thus exposed to the magnetic field gradients of the information recorded on the master tape 30.

In this manner, the information recorded on the master tape 30 is copied on the copy tape 34 in that a magnetic image of the master record appears on the latter tape.

Owing to this thermal remanent magnetization, the copied information is characterized by high signal strength and very little loss in signal-to-noise ratio. Also, the cooling step can be effected quickly and efficiently, as the temperature range between $T_1$ and $T_2$ is relatively narrow because of the high acuity of the remanence curve 12 between $T_1$ and $T_C$. If desired, the speed of the copying process may be further increased by drawing heat from the roller 45. This may be done by implementing into that roller a conduit (not shown) that is supplied with a coolant through rotatable fluid couplings (not shown).

After the copying process has been completed, the tapes 30 and 34 are wound on the separate take-up reels 32 and 36, respectively. If desired, several copies of the master record may be established in one run by bringing the master tape 30 into successive contact with further copy tapes and by repeating the steps described above with respect to the copy tape 34.

Figure 5:
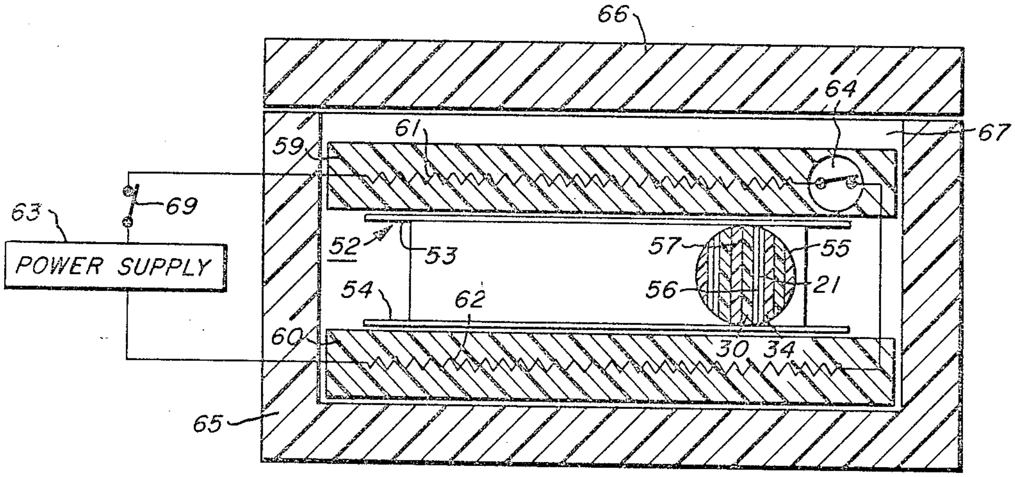
FIG. 5 is a longitudinal section of a further tape copying apparatus implementing a preferred embodiment of the subject invention.

An alternative copying method and apparatus is shown in FIG. 5. Therein, the master and copy tapes 30 and 34 are jointly coiled on a reel 52 which has flanges 53 and 54. As shown in the magnified cross-sectional outline 55, the tapes 30 and 34 are jointly coiled so that the recording surface 21 of the copy tape 34 contacts the recording surface 56 of the master tape 30. To prevent cross-talk or objectionable copying between different turns of the jointly coiled tapes, a spacer tape 57 may be co-wound with the tapes 30 and 34. To promote heat dispersion, the spacer tape 57 may be metallic or strongly metallized. Alternatively, the spacer tape 57 may be of the same or of a similar material as the tapes 30 and 34.

In the embodiment illustrated in FIG. 5, a pair of platens 59 and 60 which have the tape-bearing reel 52 disposed therebetween, supply the heat necessary for the copy or duplication process. To this effect, heating elements 61 and 62 in the platens 59 and 60 are electrically energized from a power supply 63 and controlled by a thermostat 64. To prevent undesirable magnetic interference, the elements 61 and 62 may be bifilarly wound. A housing 65 of insulating material with a removable lid 66 defines a cavity 67 for confining the assembly comprising the reel 52 and platens 59 and 60, and for thus confining the heating process. Unwinding of the tapes during this process should, of course, be avoided, and a removable tie band (not shown) may be strapped around the tape coil for this purpose.

The platens 59 and 60 are operated to heat the magnetic particles of the copy tape 34 to a temperature, such as $T_2$, which is above $T_C$. Heating is then interrupted, such as by opening a switch 69. The co-wound tapes are then permitted to cool. Cooling may be accelerated by removing the lid 66, for instance. During cooling below $T_C$, a thermal remanent magnetization takes place in the particles of the copy tape 34 due to the presence of the magnetically recorded information on the master tape 30. A faithful high-quality copy is thus produced on the copy tape 34. Instead of heating platens, another heat source, such as an infrared lamp (not shown), disposed to irradiate the reel 52 and the tapes coiled thereon, may be employed. Radio-frequency heating may also be employed to the advantage previously indicated.

The method and apparatus of FIG. 5 have the advantage that the copy process as such can proceed in a static fashion without the use of rotating machinery at that stage. Also, since no pulling of heated tapes is necessary, tapes processed according to FIG. 5 can be expected to withstand higher temperatures than if manipulated by moving machinery.

Figure 6:
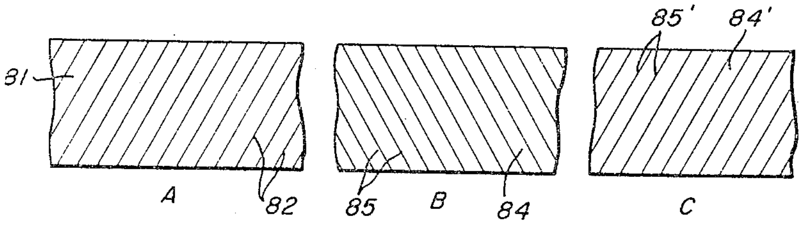
FIG. 6a, b and c schematically show three tape lengths in order to exemplify tape duplication methods according to the invention.

A particularly attractive, though by no means limiting, feature of the tape copying methods herein disclosed is exemplified by FIG. 6. For this purpose, FIG. 6*a* qualitatively illustrates a magnetic recording tape 81 which has information recorded thereon in a slant-track pattern 82. This mode of recording as well as its refinements and machinery is well known (see, for instance, Bernstein, Video Tape Recording (Rider 1960), pp. 94–109 and passim.), as is its companion, transverse-scan recording. While these recording modes are at present the only feasible approach to the recording of video signals and similar information extending into the mega-hertz range, they do have the drawback that they considerably complicate tape duplication or copying processes. Reasons for this disadvantage include the fact that video tape recording processes utilize the bandwidth of the recording process to such an extent that the tape speed during copying has to be practically the same as during recording. Also, conventional video signal copying apparatus are very complex and expensive.

The subject invention also overcomes this disadvantage. According to one embodiment thereof, the tape 81 of FIG. 6*a* corresponds to the previously described tape 30 and is used as the master tape. A tape 84, corresponding in purpose and structure to the copy tape 34 described above, is illustrated in FIG. 6*b*. Both the tapes 81 and 84 are processed together in the manner described in connection with FIG. 4 or FIG. 5, so as to produce on the tape 84 a copy 85 of the information recorded on the master tape 81.

In comparing FIGS. 6*a* and *b*, it will be noted that this results in a record which is a mirror-image of the master. While this may not give rise to problems in some linear-track recordings, the subject invention provides methods to overcome possible problems brought about by special kinds of tracking patterns.

According to one of these methods, the master is recorded so that the recording track pattern 82, indicated in FIG. 6*a*, presents a mirror image of that recording pattern which is to be produced on the copy tape 84, FIG. 6*b*, for playback with conventional type of magnetic playback equipment capable of following the track pattern 85. The copying process thus produces an unreversed recording track pattern 85 from the mirror-image master pattern 82.

An alternative method may be employed if a playback machine is available that is capable of reproducing information that is recorded in a mirror-image track pattern. In this case, the master track pattern may be recorded in an unreversed fashion, whereupon a mirror-image track pattern will result on the copy tape. To elucidate this principle, the tape 84 shown in FIG. 6*b* with a track pattern 85 is for the moment considered as the master tape, while the tape 84' shown in FIG. 6*c* with a track pattern 85' may be viewed as the copy tape.

A further alternative method may also be understood with reference to FIGS. 6*a–c*. The tape 81 is now defined as a master tape on which information is recorded in an unreversed track pattern 82. Further, the tape 84 in FIG. 6*b* is now defined as a copy tape on which information is copied by one of the methods shown in FIGS. 4 and 5 in a copy track pattern 85, that is a mirror-image of the master pattern 82. To produce an unreversed copy track pattern, the copying process is repeated with the copy tape 84 serving as a new or intermediate master and a tape 84', including shape anisotropic magnetic recording particles of the type set forth above in connection with FIG. 1, curve 12, and serving as the copy tape. As shown on the tape 84' illustrated in FIG. 6*c*, a second copy can thus be obtained on which the recording track pattern 85' presents an unreversed image of the recording track pattern 82 on the original master tape 81 shown in FIG. 6*a*.

For a successful operation of the latter method, the Curie temperatures of the recording media of the master tape 81, of the first copy tape 84, and of the second copy tape 84' are correlated as follows:

$$T_{C_1} > T_{C_2}$$

$$T_{C_2} > T_{C_3}$$

whereby $T_{C_1}$ is the Curie temperature of the master tape recording medium, $T_{C_2}$ is that of the first copy tape recording medium, and $T_{C_3}$ is that of the second copy tape recording medium. More exactly, $T_{C_1}$ is chosen so that the magnetic record on master tape 81 is preserved during the heating of the first copy tape 84 to above $T_{C_2}$, but sufficiently below $T_{C_1}$; and that the magnetic record on the first copy tape 84 is preserved during the heating of the second copy tape 84' to above $T_{C_3}$, but sufficiently below $T_{C_2}$.

The above mentioned features of the subject invention relating to thermal remanent magnetization and remanent curve acuity within a narrow temperature range permit the production of high-quality copies in the manner just discussed.

Apparatus for exploiting the features illustrated in FIG. 6 are shown in FIGS. 7 to 10.

Figure 7:
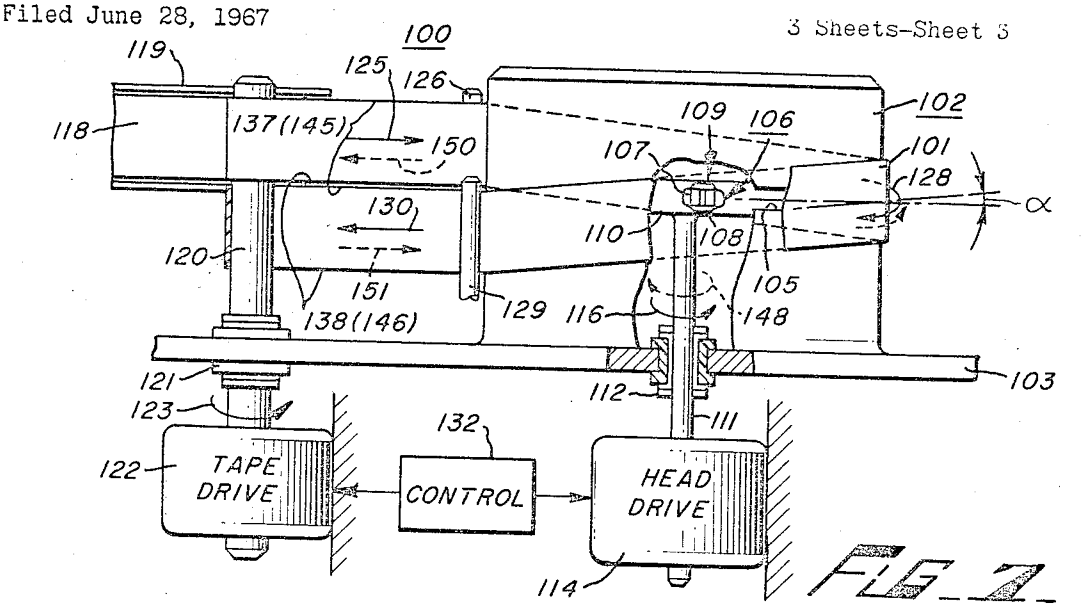
FIG. 7 is an elevation, partially in section, of essential parts of a video tape recorder.

The apparatus 100 illustrated in FIG. 7 serves to record information, such as signals representing a video program or performance, on a tape 101. To this end, the apparatus has a cylindrical drum body 102 mounted on a base plate 103. The drum body 102 may be of a conventional type now used in video tape recording and playback means, and a peripheral groove 105 is shown to indicate symbolically the rotational plane of operation of a recording head 106 which has a gapped core 107 and a winding 108. Leads 109 are connected to that winding and constitute a means for supplying information signals to this winding for their recording on the tape 101 by the recording head. As is well known in the art, these supply means customarily include also rotational signal transmission means, such as a slip ring or rotating transformer arrangement (not shown).

The recording head 106 is mounted on a rotational disc 110 which, in turn, is mounted on and driven by a shaft 111 which extends here through a bearing 112 in the base plate 103 and is rotated by a drive or motor 114 in the direction of arrow 116.

The tape 101 is unwound from a supply 118 on a reel 119 by a capstan 120 which extends through a bearing 121 in base plate 103 and is rotated by a drive or motor 122 in the direction of arrow 123. The tape thereupon moves in the direction of arrow 125 to the drum body 126. A guide roller or pin 126 holds the tape 101 against the periphery of the drum body 102.

An arrow 128 indicates how the tape 101 travels around the drum body 102 to be further guided by a roller or pin 129 located in the vicinity of the pin 126. The tape is thereupon transported in the direction of arrow 130 by the capstan 120 and is taken up by a reel (not shown) which is similar to the reel 119.

It will be noted that the tape 101 while on the drum body 102, moves or is transported at an angle $\alpha$ to the plane of rotation of the recording head 106. This is made possible by the illustrated arrangement of the guide pins 126 and 129 and the matter in which the tape is driven by the capstan 120. For the purpose of clarity of illustration, brackets for mounting the guide pins 126 and 129 have not been shown. Examples of these, as well as of other guide means for assuring or facilitating the illustrated travel of the tape, are shown in existing literature on the type of recording apparatus herein shown.

A control 132 correlates the operation of the drives 114 and 122 so that the shaft 111 and the capstan 120 are rotated in the direction of arrows 116 and 123, respectively, with the rate of rotation of the shaft 111 being higher than that of the capstan 120. In practice, the control 132 may assume the form of one of those many well-known means for controlling or determining the sense of rotation of electric motors. If for a given application a reversal of operation is not required, the control 132 may manifest itself in those components that impose on the drives 114 and 122 a predetermined sense of rotation. Generally, the control 132 may also include a mechanical or electrical coupling between drives 114 and 122. These and other well-known synchronization means are conventional and thus not in detail shown herein.

Figure 8:
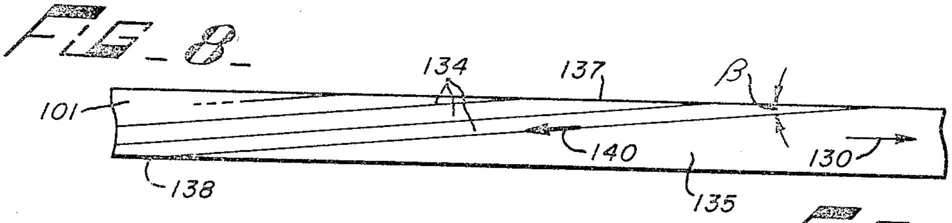
FIG. 8 is a plan view of a length of tape having tracks recorded thereon by the recorder of FIG. 7.

With the senses of rotation so far described, the recording head 106 records the information received through leads 109 along spaced parallel tracks 134 on the tape 101 (one track for each revolution of the head if only one head is used). As schematically shown in FIG. 8, these tracks 134. as seen from a top surface 135, which is here the top surface of the recording layer of the tape 101, extend from a first longitudinal edge 137 to a second longitudinal edge 138 of the tape, with the information record proceeding in a sense of direction indicated by arrow 140. Each track 134 extends at an angle $\beta$ to the upper edge 137 of the tape 135. The angle $\beta$ corresponds in magnitude approximately to the angle $\alpha$ indicated in FIG. 7, the linear motion of the tape altering it slightly. It will, of course, be understood in this connection that the tracks 134 need not necessarily extend exactly from the edge 137 to the edge 138. It is, for instance, well known that edge regions of recording tape are sometimes used for establishing a record of an audio or of an auxiliary signal accompanying the signals recorded on slant or transverse tracks. The tracks 134 may thus extend from what may be called the vicinity of the edge 137 to the vicinity of the edge 138. This is also assumed as being understood with respect to the other slant or transverse track tape recordings shown or mentioned herein.

Figure 9:
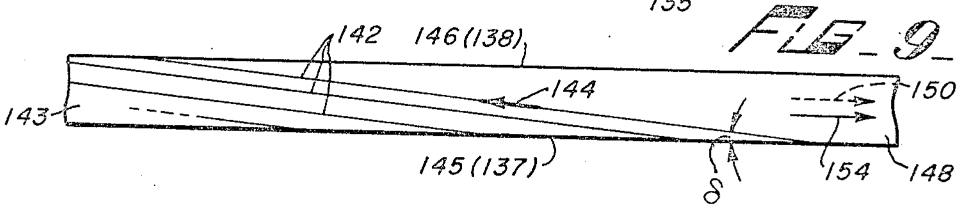
FIG. 9 is a plan view of a length of tape onto which the tracks shown in FIG. 8 have been copied.

If the information recorded on tape 101 is copied in a manner as outlined above, such as by one of the apparatus shown in FIGS. 4 and 5, the information tracks 134 on the master tape 101 appear as, or have their counterpart in, tracks 142 on the copy tape 143, and the copied information record proceeds in the sense of direction indicated by arrow 144, as shown in FIG. 9. The copy tracks 142 now extend from a first longitudinal edge 145 to a second longitudinal edge 146 of the copy tape 143. As seen from a top surface 148 of the copy tape 143, which is here the top surface of the recording layer of that tape, the track angle $\beta$ shown on the master tape 101 has a corresponding angle $\delta$ on the copy tape 143. The latter angle is a mirror image of the former angle, as is the copy track pattern 142 as compared to the master track pattern 134. The longitudinal edges 145 and 146 of the copy tape 143 can then be considered as corresponding respectively to the longitudinal edges 137 and 138 of the master tape 101.

If one considers this fact in connection with the senses of direction indicated by arrows 140 and 144, it becomes clear that a playback of the information copied on tape 143 has to proceed judiciously, lest the information be played back in reverse, at least as from track to track, or lest the playback head intersect the individual tracks rather than following them.

In short, a systematization including a modification of the relative head and tape movements from what established convention would dictate is necessary.

For instance, if one were to reverse the head rotation (see dotted arrow 148) and the direction of tape transport (see dotted arrows 150 and 151), the head 106, when operating as a playback head on a copy tape, would scan in the correct general direction (note arrow 144, FIG. 9), but would proceed from the tape edge 146 to the edge 145, instead of following the tracks 142 (see FIG. 9) from the edge 145 to the edge 146.

Figure 10:
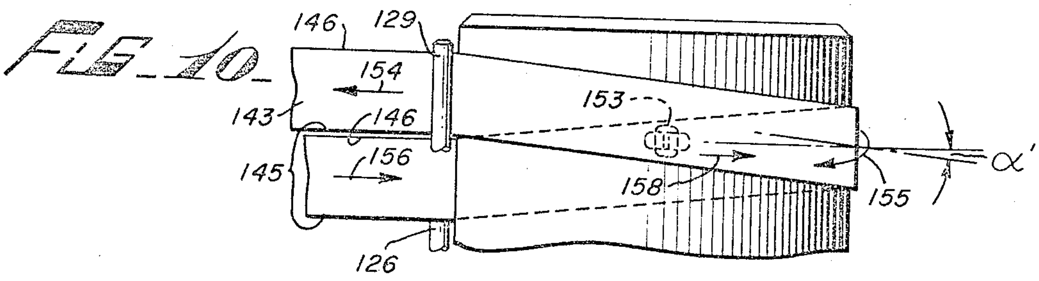
FIG. 10 is an elevation of part of the recorder of FIG. 7 and illustrates a modification of that recorder according to the invention.

One preferred method and apparatus for solving this problem according to the subject invention is illustrated in FIG. 10 where like reference numerals as among FIGS. 7 and 10 designate like parts, and where those parts that can be conveniently seen from FIG. 7 are not again illustrated.

In the apparatus of FIG. 10 the copy tape 143 to be played back by means of a rotating playback head 153, which may be structurally identical or similar to the head 106 shown in FIG. 7, is transported in the direction of the arrows 154, 155 and 156 at an angle $\alpha'$ which is a mirror image of the angle $\alpha$ shown in FIG. 7 as seen from the planes of rotation of heads 106 and 153. The means for enabling this angular reversal include the guide pins 126 and 129 which are mounted in positions reversed from those illustrated in FIG. 7.

The head 153 is driven to rotate in the direction of arrow 158 to be now capable of scanning the copy tape 143 from the edge 145 to the edge 146, track for track. The invention thus solves an intricate and vexing problem in a simple and convenient manner.

While the copying methods disclosed herein are preferred, it will be recognized that the apparatus shown in FIGS. 7 and 10 also lend themselves to use with other tape-to-tape copying procedures.

Figure 11:
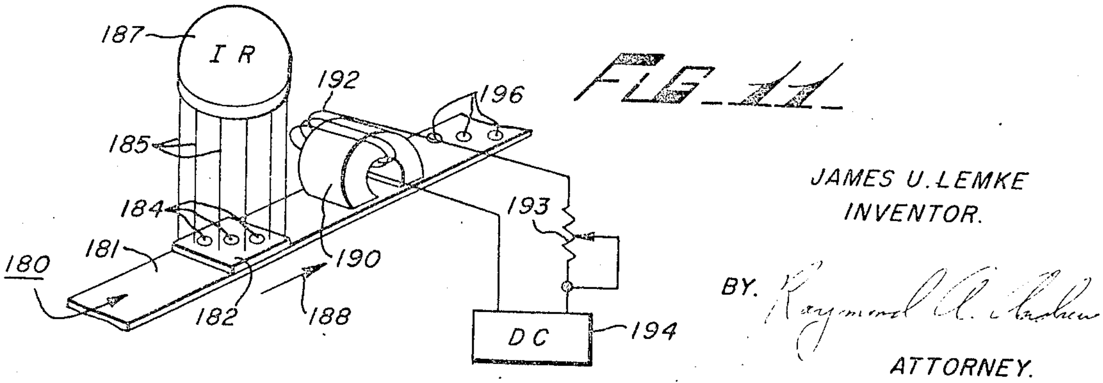
FIG. 11 is a schematic illustration of a method according to the invention which employs information-modulated heat energy.

FIG. 11 illustrates an apparatus in which information is magnetically recorded by means of information-indicative or controlled heat gradients. According to FIG. 11, a recording tape 180 which may be the same as the tape 25 shown in FIG. 3 is employed. This tape has a recording surface 181 which corresponds to the recording surface 21 illustrated in FIG. 3. The tape has magnetic recording particles (not shown) which correspond to the particles 20 shown in FIG. 3 and which are preferably oriented longitudinally as indicated at 22 in FIG. 3. These recording particles are of the above mentioned type C and display a remanence characteristic as illustrated by the curve 12 in FIG. 1.

A master record 182 of the information to be recorded is placed adjacent to the recording surface 181 of the tape 180. In the embodiment of FIG. 11, the information to be recorded is represented by three apertures 184 in the master record 182, which may be a sheet of opaque paper, for example.

The master record 182 is irradiated with heat rays 185 which in the illustrated embodiment emanate from a source 187 of infrared heat that may be composed of a heat lamp and a reflector (not shown) in a manner known per se. In accordance with known techniques, the tape 180 may be preheated before it reaches the master record 182. For instance, a second infrared heat source (not shown) may be placed ahead of the source 187 and may there be operated to heat the recording medium to a temperature somewhat below the temperature $T_1$ in FIG. 1.

The intensity of the source 187 is selected so that the heat rays which penetrate the apertures 184 locally heat corresponding regions of the body of magnetizable recording particles in the tape 180 to a temperature such as $T_2$ shown in FIG. 1 above the Curie point $T_C$.

While the recording particles are still at a temperature above $T_C$ the tape 180 is advanced in the direction of the arrow 188 so that these particles are subjected to a magnetic field provided by the electro magnet 190.

If desired, the master record 182 and the source 187 may be advanced with the tape up to the magnet 190, so that the tape 180 need not be stopped while the information-indicative heat gradients are being imposed on the tape. Alternatively, the magnet 190 may be positioned adjacent the master record 182 so that the presence of the magnetic field of the magnet 190 is assured during the cooling of the recording particles as mentioned below.

The magnet 190 has a winding 192 which is energized through a potentiometer 193 from a source of electric current 194, such as a direct-current source.

The potentiometer 193 is employed to adjust the strength of the magnetic field produced by the magnet 190 to a value at which the thermal remanent magnetization illustrated in FIG. 2 takes place as to those regions of the tape which carry the information-indicative heat gradients, but at which an objectionable magnetization of the remaining areas of the tape does not take place.

The tape speed is adjusted so that cooling of the heated recording particles from above $T_C$ to below $T_1$ (see FIG. 1) takes place while these particles are under the influence of the magnetic field produced by the magnet 190.

In this manner, a strong magnetic record 196 is produced. This record corresponds to the information represented by the apertures 184 on the master record 182. This record has the high degree of quality produced by the features illustrated in FIGS. 1 and 2.

If a visible copy of the recorded information is desired, magnetic ink or a magnetically attracted toner may be applied to the recording surface 181 of the tape 180, and the resulting information pattern may be printed on a sheet of paper or a similar suitable medium. Appropriate magnetic toners are already known.

It will be recognized that the principle illustrated in FIG. 11 lends itself to the production of copies of writings or drawings. In this case, it may be advantageous to produce the required heat gradients by irradiating the master record through the recording medium, as contemplated above in connection with FIG. 3 and to use either the reflected heat or the differentials in heat absorption by the master record to establish the mentioned heat gradients.

While many advanced features, methods and apparatus are disclosed herein in a specific manner, those skilled in the art will recognize that various modifications and extensions of the underlying principles are possible within the scope and spirit of the invention.

I claim:

1. A method of magnetically recording information, comprising the steps of:
   (a) preparing a magnetizable medium characterized by magnetic particles have a shape anisotropy which
      (1) imparts upon said particles a substantially stable remanence up to a predetermined temperature in the vicinity of the Curie point of said particles, and
      (2) dominates other qualities of said particles which tend to cause remanence diminutions in derogation of said substantially stable remanence; and
   (b) subjecting said medium to information-controlled thermal remanent magnetization which includes the steps of
      (1) heating at least selected ones of said particles to an elevated temperature being at least as high as substantially said Curie point,
      (2) cooling said selected particles to below said predetermined temperature, and
      (3) magnetizing said selected particles during said cooling step.

2. A method as claimed in claim 1, wherein said thermal remanent magnetization includes the steps of
   (1) heating said selected particles from below said predetermined temperature to at least said Curie point in accordance with information to be recorded, and
   (2) magnetizing said selected particles at least while said selected particles are cooling from said Curie point to below said predetermined temperature.

3. A method as claimed in claim 1, wherein said thermal remanent magnetization includes the step of imposing on said medium an information-controlled magnetization during said cooling of said selected particles.

4. A method of magnetically recording information, comprising the steps of:
   (a) preparing a magnetizable medium characterized by magnetic particles having a shape anisotropy which
      (3) imparts upon said particles a substantially stable remanence up to a predetermined temperature in the vicinity of the Curie point of said particles, and a rapidly declining remanence between said predetermined temperature and said Curie point, and
      (2) dominates other qualities of said particles which tend to cause remance diminutions in derogation of said substantially stable remanence; and
   (b) subjecting said medium to information-controlled thermal remanent magnetization which includes the steps of
      (1) heating at least selected regions of said medium to an elevated temperature being at least as high as substantially said Curie point,
      (2) cooling said selected regions from said elevated temperature, and
      (3) magnetizing said medium during said cooling step.

5. A method of magnetically recording information, comprising the steps of:
   (a) preparing a magnetizable medium characterized by magnetic particles having a shape anisotropy which
      (1) imparts upon said particles a substantially stable remanence up to a predetermined temperature in the vicinity of the Curie point of said particles, and a rapidly declining remanence between said predetermined temperature and said Curie point, and
      (2) dominates other qualities of said particles including crystal anisotropy which tend to cause remanence diminutions in derogation of said substantially stable remanence; and
   (b) subjecting said medium to information-controlled thermal remanent magnetization which includes the steps of
      (1) heating said medium to an elevated temperature being at least as high as said Curie point,
      (2) cooling said medium from said elevated temperature, and
      (3) imposing on said medium an information-controlled magnetization during said cooling step.

6. A method as claimed in claim 5, wherein said information-controlled magnetization is imposed on selected regions of said medium.

7. A method of copying information which is magnetically recorded on a first magnetc recording medium having a first Curie point, comprising the steps of:
   (a) preparing a second magnetic recording medium characterized by magnetic particles which
      (1) have a second Curie point below said first Curie point, and
      (2) have a shape anisotropy which
         (i) imparts upon said particles a substantially stable remanence up to a predetermined temperature in the vicinity of said second Curie point, and a rapidly declining remanence between said predetermined temperature and said second Curie point, and
         (ii) dominates other qualities of said particles which tend to cause remanence diminutions in derogation of said substantially stable coercivity;
   (b) heating at least said second magnetic recording medium to an elevated temperature above said second Curie point but below said first Curie point; and
   (c) subjecting said second magnetic recording medium to the magnetizing effect of the information magnetically recorded on said first recording medium, and simultaneously cooling said second magnetic recording medium to below said second Curie point so as to copy said information on said second recording medium by thermal remanent magnetization.

8. A method as claimed in claim 7, including the step of further copying said copied information by:

(a) preparing a third magnetic recording medium characterized by magnetic particles which
  (1) have a third Curie point below said second Curie point, and
  (2) have a shape anisotropy which
    (i) imparts upon said particles a substantially stable remanence up to a predetermined temperature in the vicinity of said third Curie point, and a rapidly declining remanence between the latter predetermined temperature and said third Curie point, and
    (ii) dominates other qualities of said particles which tend to cause remanence diminutions in derogation of said latter substantially stable coercivity;

(b) heating at least said third magnetic recording medium to a temperature above said third Curie point but below said second Curie point; and (c) subjecting said third magnetic recording medium to the magnetizing effect of the information copied on said second recording medium, and simultaneously cooling said third magnetic recording medium to below said third Curie point so as to copy said information from said second to said third recording medium by thermal remanent magnetization.

9. A method as claimed in claim 7, wherein at least said second magnetic recording medium is heated by radio frequency magnetic fields.

10. A method as claimed in claim 7, wherein
(a) said first medium is present in the form of a first magnetic recording tape;
(b) said second medium is prepared in the form of a second magnetic recording tape;
(c) said first and second recording tapes are brought into mutual contact at successive portions;
(d) at least said second recording tape is heated progressively along its length to said elevated temperature when in contact with said first recording tape; and
(e) said first and second recording tapes are cooled while in mutual contact so as to copy information recorded on the first tape onto the second tape by thermal remanent magnetization.

11. A method as claimed in claim 7, including the step of magnetically recording said information onto said first recording medium in a first recording track pattern which is a mirror image of a second recording track pattern required for playback of said information under a predetermined convention.

12. A method as claimed in claim 7, wherein
(a) said first medium is present in the form of a first recording tape; and
(b) said second medium is prepared in the form of a second recording tape; with
(c) said first and second recording tapes being jointly wound in the form of a coil; and
(d) said coil being heated to a temperature above said second Curie point but below said first Curie point, and subsequently cooled to below said second Curie point so as to copy the information recorded on the first tape onto the second tape by thermal remanent magnetization.

13. A method as claimed in claim 12, including the step of cowinding a spacer tape with said first and second recording tapes to reduce cross-talk in said coil.

References Cited

UNITED STATES PATENTS

| | | | |
|---|---|---|---|
| 2,915,594 | 12/1959 | Burns et al. | 346—74 |
| 3,005,056 | 10/1961 | Goldmark et al. | 179—100.2 |
| 3,026,215 | 3/1962 | Fukuda et al. | 179—100.2 |
| 3,117,065 | 1/1964 | Wootten | 346—74 |
| 3,341,854 | 9/1967 | Supernowicz | 340—74 |
| 2,867,692 | 1/1959 | Camras | 179—100.2 |
| 3,465,105 | 11/1969 | Kumada et al. | 179—100.2 |
| 3,164,816 | 1/1965 | Chang et al. | 346—74 |
| 3,343,174 | 9/1967 | Kornel | 346—74 |
| 3,364,496 | 1/1968 | Greiner et al. | 346—74 |

OTHER REFERENCES

Mayer, Ludwig, "Curie-Joint Writing on Magnetic Films," Journal of Applied Physics, June 1958, vol. 29, p. 1003.

BERNARD KONICK, Primary Examiner

R. S. TUPPER, Assistant Examiner

U.S. Cl. X.R.

179—100.2

PO-1050
(5/69)

UNITED STATES PATENT OFFICE
CERTIFICATE OF CORRECTION

Patent No. 3,541,577 Dated November 17, 1970

Inventor(s) James U. Lemke

It is certified that error appears in the above-identified patent and that said Letters Patent are hereby corrected as shown below:

Column 3, line 45, "experssion" should read --expression--. Column 4, line 55, "TC" should be --$T_C$--. Column 5, line 30, "and efficiently", second occurrence, should be deleted and line 72, --during-- should be inserted after "fields". Column 7, line 37, "roller" should be --rollers--. Column 13, line 34, "have" should be --having--; and line 71, "(3)" should be --(1)--. Column 14, line 64, "coercivity" should be --remanence--. Column 15, line 18, "coercivity" should be --remanence--.

Signed and sealed this 29th day of June 1971.

(SEAL)
Attest:

EDWARD M.FLETCHER,JR.
Attesting Officer

WILLIAM E. SCHUYLER, JR.
Commissioner of Patents